(12) United States Patent
Meersseman (10) Patent No.: US 12,420,580 B2
(45) Date of Patent: Sep. 23, 2025

(54) PRESSING ELEMENT (71) Applicant: FLOORING INDUSTRIES LIMITED, SARL, Bertrange (LU)

(72) Inventor: Laurent Meersseman, Mont de l'Enclus (BE)

(73) Assignee: UNILIN BV, Wielsbeke (BE)

( * ) Notice: Subject to any disclaimer, the term of this patent is extended or adjusted under 35 U.S.C. 154(b) by 359 days.

(21) Appl. No.: 17/760,498

(22) PCT Filed: Jan. 18, 2021

(86) PCT No.: PCT/IB2021/050338
§ 371 (c)(1),
(2) Date: Aug. 10, 2022

(87) PCT Pub. No.: WO2021/161114
PCT Pub. Date: Aug. 19, 2021

(65) Prior Publication Data
US 2023/0056626 A1   Feb. 23, 2023

Related U.S. Application Data

(60) Provisional application No. 62/980,580, filed on Feb. 24, 2020.

(30) Foreign Application Priority Data

Feb. 13, 2020   (BE) .................................. 2020/5088

(51) Int. Cl.
*B44B 5/02* (2006.01)
*B27N 7/00* (2006.01)
(Continued)

(52) U.S. Cl.
CPC .............. *B44B 5/026* (2013.01); *B27N 7/005* (2013.01); *B44C 1/24* (2013.01); *B44C 5/04* (2013.01)

(58) Field of Classification Search
CPC ................................. B44C 1/24; B44B 5/026
See application file for complete search history.

(56) References Cited

U.S. PATENT DOCUMENTS 8,499,519 B2 *   8/2013   Meersseman ............. B44C 3/08
                                                          52/390
9,529,264 B2     12/2016  Reichert
(Continued)

FOREIGN PATENT DOCUMENTS

EP   1987395 A1   11/2008
EP   2123476 A2   11/2009
(Continued)

OTHER PUBLICATIONS

Search Report from corresponding Belgian Application No. BE2020/5088, Nov. 19, 2020.
(Continued)

*Primary Examiner* — Xiao S Zhao
*Assistant Examiner* — Nicholas J Chidiac
(74) *Attorney, Agent, or Firm* — Workman Nydegger (57) ABSTRACT

A pressing element for manufacturing laminate panels includes a metal plate with at least two sections that exhibit a surface structure suitable for forming a structure on one of the laminate panels, and having a first zone. The pressing element has separate markings for orienting the first zone, and/or in that the surface structure is obtained by way of etching, whereas the first zone is provided with a chamber by means of a milling operation, and/or in that the surface structure defines a lowest point and a highest point. The first zone includes a first chamber located at a depth below the highest point and at most 0.3 mm below the lowest point.

9 Claims, 4 Drawing Sheets

(51) Int. Cl.
  *B44C 1/24*     (2006.01)
  *B44C 5/04*     (2006.01)

(56) References Cited

U.S. PATENT DOCUMENTS

| | | | |
|---|---|---|---|
| 10,507,475 B2 | 12/2019 | Reichert | |
| 10,953,686 B2* | 3/2021 | Maesen | B31F 1/07 |
| 2010/0006542 A1 | 1/2010 | Reichert | |
| 2010/0242391 A1* | 9/2010 | Meersseman | B44C 3/005 52/311.1 |
| 2011/0117325 A1* | 5/2011 | Segaert | E04F 15/02 264/482 |
| 2015/0056416 A1* | 2/2015 | Maesen | B31F 1/07 264/293 |
| 2017/0065989 A1 | 3/2017 | Reichert | |
| 2021/0285232 A1* | 9/2021 | Fahle | B44B 5/026 |

FOREIGN PATENT DOCUMENTS

| | | |
|---|---|---|
| EP | 2251193 A1 | 11/2010 |
| EP | 2123476 A3 | 5/2011 |
| EP | 1987395 B1 | 12/2011 |
| EP | 2123476 B1 | 7/2014 |
| EP | 2834076 A2 | 2/2015 |
| EP | 2834076 B1 | 7/2018 |
| WO | 9747834 A1 | 12/1997 |
| WO | 0196689 A1 | 12/2001 |
| WO | 0198603 A2 | 12/2001 |
| WO | 0198603 A3 | 12/2001 |
| WO | 2006066776 A2 | 6/2006 |
| WO | 2006066776 A3 | 6/2006 |
| WO | 2013150414 A2 | 10/2013 |
| WO | 2014115086 A2 | 7/2014 |
| WO | 2014115086 A3 | 7/2017 |

OTHER PUBLICATIONS

International Search Report from PCT Application No. PCT/IB2021/050338, May 21, 2021.

* cited by examiner

PRESSING ELEMENT

BACKGROUND

The present invention relates to pressing elements and to a method for manufacturing pressing elements, wherein these pressing elements can be employed in the manufacture of coated decorative panels.

More specifically, the invention relates to the manufacture of pressing elements which are employed in a method for manufacturing coated panels, wherein the coated panels are of the type that comprises a substrate and a decorative top layer applied thereto. These can for example be floor panels which are primarily composed of a substrate, for example an MDF or HDF (medium-density or high-density fiberboard) panel, and a top layer applied thereto, such as a laminate top layer.

In particular, the invention relates to pressing elements which are used in a method for manufacturing coated panels with a printed decor with a transparent or translucent plastics layer extending on top thereof. It is known that such a decor may be printed directly onto the substrate, optionally with the use of base layers. However, the decor may also be provided on a sheet of material, such as a sheet of paper or a plastic film, which is incorporated in the aforementioned top layer. The transparent or translucent plastics layer forms a protective layer on top of the printed decor and may, for example, comprise wear-resistant particles such as aluminum oxide. It is not ruled out that this protective layer also comprises a sheet of material, such as a sheet of paper or plastic film. By way of example, this may concern the manufacture of laminate floor panels, for example according to a DPL (direct pressure laminate) or HPL (high pressure laminate) technique. In the case of a DPL technique, one or more sheets of material provided with resin, together with the substrate, are inserted into a pressing device where they are connected both to one another and to the substrate by means of a pressing element and under the action of elevated pressure and temperature. In the case of an HPL technique, the top layer is formed separately on the basis of two or more sheets of material provided with resin before the thus obtained top layer is applied to the substrate, for example by adhesively bonding said top layer to the substrate. According to another possibility, this may concern the manufacture of plastics-based floor panels or floor coatings, such as, for example, vinyl panels, vinyl coating and the like.

It is known, for example from WO 01/96689 or WO 2014/115086, that a relief of impressed portions can be formed on the surface or the decorative side of such coated panels, whereby it is for example possible for the natural structure of the motif depicted in the aforementioned decor to be imitated. By way of example, in the case where the decor depicts a wood motif, a relief which imitates a wood structure can be realized. Such a wood structure may possibly correspond to the underlying decor, whereby it is then possible to obtain so-called impressions in register with the printed decor.

As is known, structured pressing elements are used to realize a relief on the decorative side. For the manufacture of such pressing elements, various techniques are known, for example from WO 2006/066776, EP 2 123 476, EP 2 251 193, EP 1 987 395 and EP 2 834 076. EP'395 discloses a method for manufacturing structured pressing elements, wherein the method comprises at least the following steps:

the step of providing an element made of metal;
the step of applying a mask to a surface of the element in order to protect portions of the aforementioned surface;
the step of chemically machining or etching non-protected portions of the aforementioned surface of the element; and
the step of removing the aforementioned mask.

The pressing elements obtained by means of the methods from the prior art fall short in particular when they are employed to produce relatively deep structural portions in the surface of the pressing element in question, for example in the case of structural portions with a depth greater than 0.15 millimeters, or 0.3 millimeters or more.

SUMMARY

The present invention is aimed at an alternative pressing element which, according to various preferred embodiments of the invention, may offer advantages over the prior art.

To this end, the present invention, according to its first independent aspect, relates to a pressing element for manufacturing coated panels, more specifically laminate panels, wherein this pressing element comprises a metal plate having at least two sections which exhibit a surface structure suitable for forming a structure on in each case one of the aforementioned coated panels, and having a first zone which extends in a first direction between the aforementioned two sections, with the characteristic feature that the aforementioned pressing element comprises one or more separate markings which make it possible to position and orient the aforementioned first zone. The presence of markings makes it possible for the pressing element to be able to be subsequently machined in a separate device, wherein good alignment of the relevant zone can be achieved in the relevant subsequent machining operation by means of the aforementioned one or more markings. Preferably, the markings themselves are obtained by means of the same operation as is used to produce the aforementioned surface structure in the relevant sections. In this way, the risk of incorrect positioning of the markings can be minimized.

Preferably, the pressing element has at least two rows of in each case at least two aforementioned sections with an aforementioned first zone, wherein, between the aforementioned rows, a second zone also extends in a second direction transverse to the aforementioned first direction, and in that the aforementioned one or more separate markings make it possible to position and orient both the aforementioned first zone and the aforementioned second zone.

It is clear that, in the case of a pressing operation using the press plate according to the invention, a larger coated plate is obtained and that the aforementioned coated panels are obtained from this coated plate by dividing it. In this case, the aforementioned first and/or second zones preferably form so-called technical zones, namely zones which, during the pressing operation, are positioned above a portion of the plate to be compressed that is intended to be removed when said plate is divided into coated panels.

Preferably, the aforementioned one or more markings are applied to one or more edge portions of the surface of the metal plate. The central portion of the surface of the metal plate may then comprise the aforementioned sections, first and/or second zones. It goes without saying that the structured surface of an aforementioned section preferably at least corresponds to the surface of the intended coated panel. Preferably, such a section is completely surrounded by first and second zones. Such a section may have a rectangular or virtually rectangular surface with a width of between 14.0 cm and 22.5 cm, and/or with a length of between 115.0 cm and 220.0 cm. The aforementioned first direction preferably coincides with the direction of the long pair of edges of the relevant sections. The pressing element preferably comprises at least two rows of at least five sections of this kind, or at least four rows of at least seven sections of this kind. Preferably, at least the centrally located sections are flanked both along their long pair of edges and their short pair of edges by a first or second zone, respectively. Better still, all of the sections, both the centrally located sections and the sections located along the outer edge, are flanked on both pairs of edges by a first or second zone.

Preferably, at least one of the aforementioned markings is linear, preferably parallel to the aforementioned first direction. As an alternative, it is also possible for a plurality of markings to be used, which fundamentally define a line which is preferably parallel to the aforementioned first direction.

As mentioned above, the surface structure of the aforementioned sections and at least one of the aforementioned markings are preferably obtained by means of the same operation, preferably by means of a chemical operation or etching operation.

The invention is mainly of interest for pressing elements in which the surface structure of the aforementioned sections comprises an edge portion which rises in the direction toward the aforementioned first zone and/or second zone. Such a rising structural element may for example be used to produce a region which is located at a relatively low position on the edge of the final coated panel. Such a region which is located at a relatively low position is preferably also coated, preferably by means of the same coating that is located on the overall surface of the panel and extends continuously on and over the region which is located at a relatively low position. Such a region which is located at a relatively low position is preferably configured in the form of a straight or curved bevel or chamfer. The region which is located at a relatively low position is preferably at least, and better still exclusively, obtained by way of deformation of the plate to be compressed and/or the coating in a pressing operation using the pressing element of the invention.

The subsequent machining of the aforementioned first and/or second zone is mainly of interest in the manufacture of pressing elements intended for the manufacture of coated panels with edge regions which are located at a relatively low position. Preferably, in such a case, the first and/or the second zone are/is subsequently machined in such a way that said zone or zones comprise a chamber that is located at a lower position than the highest point of the aforementioned rising edge. It is known per se, for example from WO 2006/066776, that such chambers which lie at a lower position can minimize the risk of the occurrence of pressing defects. Such a chamber preferably extends over the full length or virtually the full length of the relevant zone. In a transverse direction, the chamber in question preferably covers at least 50% of the width of the zone, and better still at least 65% or 70% or at least 80% of said width, wherein the width of the zone is defined as the width of the aforementioned technical zone, namely the distance between the upper edges of adjacent coated panels, which are yet to be formed, in the compressed coated plate.

In the cases where the surface structure, including the aforementioned rising edge, of the aforementioned sections is produced by means of a chemical operation, a plurality of operating steps, for example etching steps, are preferably performed. As a result of this manner of working, a step-like structure is produced on the rising edge, said structure being minimized or eliminated during a polishing operation. This polishing operation could be difficult or impossible to perform without the rising edge being largely or completely removed if the zone which extends between two such rising edges of adjacent sections were already provided with a cavity at the desired depth by means of the same etching steps. According to a preferred embodiment, the present invention proposes that the relevant zones be provided with a chamber at the desired depth in a subsequent machining operation, that is to say after etching and possibly polishing. In this case, the markings of the first aspect are of particular importance.

With the same goal as in the first independent aspect, the present invention, according to an independent second aspect, relates to a pressing element for manufacturing coated panels, more specifically laminate panels, wherein this pressing element comprises a metal plate having at least two sections which exhibit a surface structure suitable for forming a structure on in each case one of the aforementioned coated panels, and having a first zone which extends in a first direction between the aforementioned two sections, with the characteristic feature that the aforementioned surface structure is substantially obtained by way of a chemical operation or etching, whereas the aforementioned first zone is provided with a chamber, preferably substantially by means of a milling operation. It is clear that the pressing element of the second aspect may possibly have the features of the first independent aspect and/or the preferred embodiments thereof.

The relevant zone may subsequently be machined in a precise manner by means of a milling operation in order to form a chamber at the desired depth. Preferably, the markings mentioned in the first aspect are used during the clamping of the pressing element in the milling machine. These markings are preferably obtained by way of the aforementioned etching or chemical machining.

With the same goal as in the first and the second independent aspect, the present invention, according to an independent third aspect, also relates to a pressing element for manufacturing coated panels, more specifically laminate panels, wherein this pressing element comprises a metal plate having at least two sections which exhibit a surface structure suitable for forming a structure on in each case one of the aforementioned laminate panels, and having a first zone which extends in a first direction between the aforementioned two sections, with the characteristic feature that the aforementioned surface structure defines a lowest point and a highest point, wherein the aforementioned first zone comprises a first chamber which is located at a depth below the aforementioned highest point and at most 0.3 mm below the aforementioned lowest point, but preferably at the level of or above the lowest point (36). It is clear that the pressing element of the third aspect may possibly have the features of the first and/or the second independent aspect and/or the preferred embodiments. Since the first chamber is located at a depth below the highest point of the surface structure, it can be ensured that sufficient pressure is exerted at the location of the highest point during the pressing of the relevant panels. Since the first chamber is located at most 0.3 mm below the lowest point of the surface structure, it is still possible for pressure to be exerted at the location of the first chamber, such that sufficient curing and/or adhesion of the relevant coating also takes place there. For it is expected that in the case of the customary substrate materials, such as HDF or MDF (high-density or medium-density fiberboard), an overall reduction in thickness of approximately 0.3 mm takes place during the pressing operation, at pressures of 20 bar, 40 bar or more.

Preferably, the aforementioned chamber is located at a depth which deviates by at most 0.2 mm from the aforementioned lowest point, either below or above the aforementioned lowest point, but preferably virtually at the level of the deepest point. If the overall level of the aforementioned chamber deviates by not more than 0.2 mm from the lowest point of the surface structure of the adjacent sections, it is possible to guarantee a good distribution of pressure on the relevant sections. The inventor has even determined that the pressing pressure required for producing edge regions which are located at a relatively low position by way of deformation of the substrate is lower if such a chamber is implemented. By way of example, pressing may instead be performed at 80 bar, 55 bar or less. The use of a chamber with a depth according to the present preferred embodiment also ensures that the substrate material to be pressed away at the relatively low edge regions of the coated panel can manifest at the location of the relevant zone or chamber, and thus does not produce any spring-back effects, or fewer, of the substrate material, for example MDF or HDF, on the edge region itself which is located at a relatively low position. A better copy of the structured surface of the relevant section of the pressing element is thus obtained.

Preferably, the pressing element has at least two rows of in each case at least two aforementioned sections with an aforementioned first zone, wherein, between the aforementioned rows, a second zone also extends in a second direction transverse to the aforementioned first direction, and in that the chambers of the first and the second zone, at least at the location of their intersection, are configured to be shallower than their overall depth. Such an embodiment affords advantages in the further manufacture of the coated panel in question. It ensures, for example, that the corresponding zone which is located at a higher position, for example at the transverse edge of such a rectangular panel, does not form an obstruction during processing of the long edge. By way of example, the slide shoes of a continuous milling machine for profiling the long panel edges may thus make obstruction-free contact with the upper surface of the coated panel.

Such a first and/or second chamber preferably extends over the full length or virtually the full length of the respective zone. In a transverse direction, the chamber in question preferably covers at least 50% of the width of the zone, and better still at least 65% or 70% or at least 80% of said width, wherein the width of the zone is defined as the width of the aforementioned technical zone, namely the distance between the upper edges of coated panels which are adjacent in the compressed coated plate but which are yet to be formed.

With the same goal as in the first, second and third independent aspects, the present invention, according to an independent fourth aspect, also relates to a method for manufacturing a pressing element, wherein this pressing element comprises an element made of metal or a metal plate having at least two independent sections which exhibit a surface structure, and having a first zone which extends in a first direction between the aforementioned two sections, wherein the method comprises at least the following steps:
  the step of providing an element made of metal, such as a metal plate;
  the step of providing at least two sections with a surface structure and one or more markings by means of a chemical operation or etching operation;
  the step of clamping the etched element, for example the metal plate, on a separate machine, wherein the aforementioned markings are used for positioning and orienting the element, more specifically the metal plate;
  the step of subsequently machining the aforementioned first zone at least by means of a subtractive operation carried out on the aforementioned separate machine.

As mentioned above in the context of the aforementioned aspects, the separate subsequent machining by means of a subtractive operation, such as a milling operation, leads to particular possibilities such as the subsequent provision of chambers in the first and/or second zones, said chambers lying below the highest point of the surface structure.

Preferably, the aforementioned separate machine is a milling machine having one or more rotating milling tools is. In particular, a gantry-type milling machine having a magnetic clamping table is used.

It is clear that during the step of subsequent machining a subtractive operation can also be performed at the location of the possible second zones, for example in order to form a chamber similar to that in the first zone, for example with the same or virtually identical width and depth. Preferably, as mentioned above, a cavity of smaller depth, for example 0.05 to 0.25 mm shallower, is produced at any intersections of the first and second zones, wherein a difference in depth at the intersection of 0.2 is a good value.

It goes without saying that the method of the fourth aspect is preferably implemented to produce pressing elements having the features of the first, the second and/or the third aspect and possibly of the preferred embodiments thereof.

According to a fifth independent aspect, the invention relates to a method for manufacturing coated panels, more specifically laminate panels, wherein these coated panels are provided with a structured surface by means of a pressing operation, with the characteristic feature that a pressing element according to one or more of the preceding aspects or the preferred embodiments thereof is used in the aforementioned pressing operation.

It goes without saying that coated panels obtained by way of a method according to the fifth aspect of the invention also form part of the present invention. The coated panels in question are preferably of the type that comprises a substrate and a decorative top layer applied thereto. These can for example be floor panels which are primarily composed of a substrate, for example an MDF or HDF (medium-density or high-density fiberboard) panel, and a top layer applied thereto, such as a laminate top layer.

Preferably, the pressing elements of the invention are used in a method for manufacturing coated panels with a printed decor with a transparent or translucent plastics layer extending on top thereof. The decor may be printed directly onto the substrate, optionally with the use base layers. However, the decor may also be provided on a sheet of material, such as a sheet of paper or a plastic film, which is incorporated in the aforementioned top layer. The transparent or translucent plastics layer forms a protective layer on top of the printed decor and may, for example, comprise wear-resistant particles such as aluminum oxide. It is not ruled out that this protective layer also comprises a sheet of material, such as a sheet of paper or plastic film. By way of example, this may concern the manufacture of laminate floor panels, for example according to a DPL (direct pressure laminate) or HPL (high pressure laminate) technique. In the case of a DPL technique, one or more sheets of material provided with resin, together with the substrate, are inserted into a pressing device where they are connected both to one another and to the substrate by means of a pressing element having the features of the invention and under the action of elevated pressure and temperature. In the case of an HPL technique, the top layer is formed separately on the basis of two or more sheets of material provided with resin before the thus obtained top layer is applied to the substrate, for example by adhesively bonding said top layer to the substrate. According to another possibility, this may concern the manufacture of plastics-based floor panels or floor coatings, such as, for example, vinyl panels, vinyl coating and the like.

The element made of metal, from which the method of the fourth aspect proceeds, can be configured in various ways, of which several possibilities are listed below.

According to a first possibility, and the most preferred embodiment of all of the aspects, the element is a flat element made of metal, preferably made of steel, in particular a steel plate. Such an element can have an overall thickness of between 1.5 and 10 mm. The element from which the method proceeds can have a flat surface to be treated. It can be a ground surface, for example.

According to a second possibility, the element is a roller or drum whose surface at least consists of metal, for example of copper.

According to a third possibility, the element is a metal, for example steel, band, the ends of which may or may not be fastened to each other in order to form an endless band.

The chemical operation or etching operation mentioned in the aspects is preferably preceded by the application of a mask, for example carried out by means of a digital printing technique directly onto the surface of the aforementioned element, preferably by means of an inkjet printing technique. By way of example, a printing technique similar to that of EP 1 987 395 can be used. A digital printing technique makes it possible for optionally preformed flat and non-flat elements to be provided with a mask in a simple manner.

As has already been cited several times, the primary interest of the invention, according to its various aspects, is when pressing elements have to be provided with deep structural portions, for example with a depth of more than 0.15 mm or even of 0.4 mm or more, wherein this depth is preferably achieved during the step of chemical machining. In other words, this means that, during the machining step, material is removed to a depth of more than 0.15 mm, or more than 0.4 mm.

As mentioned above, the aforementioned chemical machining step is preferably repeated several times, material of the relevant surface being etched with a depth of preferably 20 to 120 micrometers in each step. Since thin small layers are successively etched, it is possible to obtain a sharper image. Preferably, residual products are removed from the relevant surface after each step, for example by means of a blowing device. The step-like flanks of the regions which have been etched in layerwise fashion are preferably polished.

It is clear that the pressing elements manufactured according to the various aspects of the invention are preferably used in a method for manufacturing coated panels, wherein these panels are of the type that comprises at least a substrate, a decor and a plastics-based top layer, wherein the method comprises at least the following steps:
- making the relevant pressing element by way of a method in accordance with one or more of the preceding aspects or the preferred embodiments thereof, wherein the surface of this pressing element is provided with a structure or relief;
- forming the aforementioned coated panels, wherein the aforementioned pressing element is used to form, by means of the aforementioned relief, impressed portions in the decorative side of the coated panels, and more specifically in the decorative side of plates from which such coated panels can then be obtained.

Preferably, the material used for the pressing element of the invention is metal, such as a steel alloy or a copper alloy.

During the step of forming the coated panels, use is preferably made of the DPL technique described above.

In a particularly preferred embodiment, the pressing element is provided with a relief which has the form of a wood structure.

It is clear that the use of the pressing elements of the present invention is not restricted to the manufacture of coated panels depicting a wood structure or wood motif. The present invention can also be used when the printed decor and the associated structure are a stone motif or a stone structure, respectively, or when fantasy motifs or fantasy structures are involved.

Moreover, the pressing elements manufactured according to the present invention are of particular interest when the aforementioned decor depicts a motif and when the aforementioned relief and the motif of the aforementioned decor correspond to one another, such that the aforementioned impressed portions in the decorative side at least partially follow the aforementioned motif or at least partially coincide therewith. This relates to impressed portions which are applied so as to be "in register" with the underlying motif of the preferably printed decor. This embodiment makes it possible to obtain particularly convincing imitations of, for example, solid wood.

BRIEF DESCRIPTION OF THE DRAWINGS

With the aim of presenting the features of the invention better, some preferential embodiments are described below as examples without limitative character, with reference to the appended drawings, in which.

DETAILED DESCRIPTION OF VARIOUS EMBODIMENTS

Figures 1, 2:
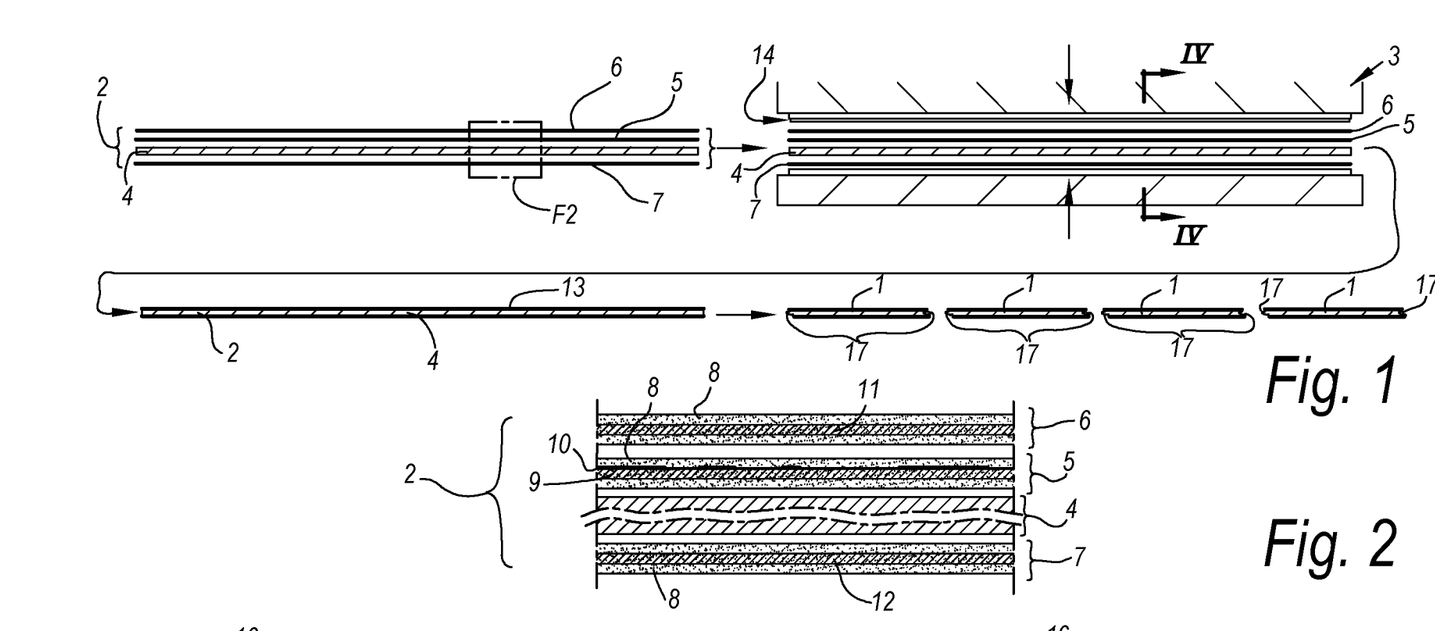
FIG. 1 schematically shows a press with a pressing element according to the invention for manufacturing laminate panels.
FIG. 2 shows the portion indicated by F2 in FIG. 1 on a larger scale.

FIG. 1 shows a method for manufacturing floor panels 1, wherein said method proceeds from plate-shaped elements 2 which are subjected to a pressing operation in a press 3.

In the schematically shown example of FIG. 1, the plate-shaped elements 2 are configured as DPL (direct pressure laminate) and the constituent layers thereof are consolidated in the press 3 to form a single unit. In this case, the DPL is composed in a known manner of a substrate 4, preferably an MDF or HDF plate (medium-density fiberboard or high-density fiberboard), and one or more, in this case three, resin-coated material layers 5-6-7, including a printed decor layer 5.

The layer construction shown in FIG. 1 is shown in more detail in the enlarged view of FIG. 2 for the purpose of illustration, wherein the constituent layers to be compressed are depicted at a distance above one another. Located on the upper side of the substrate 4 are two of the aforementioned resin-coated material layers, the aforementioned decor layer 5 and the so-called overlay 6, respectively. The decor layer 5 is composed of a carrier sheet 9, for example paper, which is provided with resin 8 and which is printed with a decor 10. The overlay 6 is composed of a carrier sheet 11, for example unfilled paper, which is also provided with resin 8 and which becomes transparent after the compression operation. Hard particles, such as corundum, are preferably worked into this overlay 6 in order to increase the wear resistance of the final product. The third material layer 7, which is present on the lower side of the substrate 4, is also composed of a carrier sheet 12 provided with resin 8 and is intended to function as a backing layer.

Figure 3:
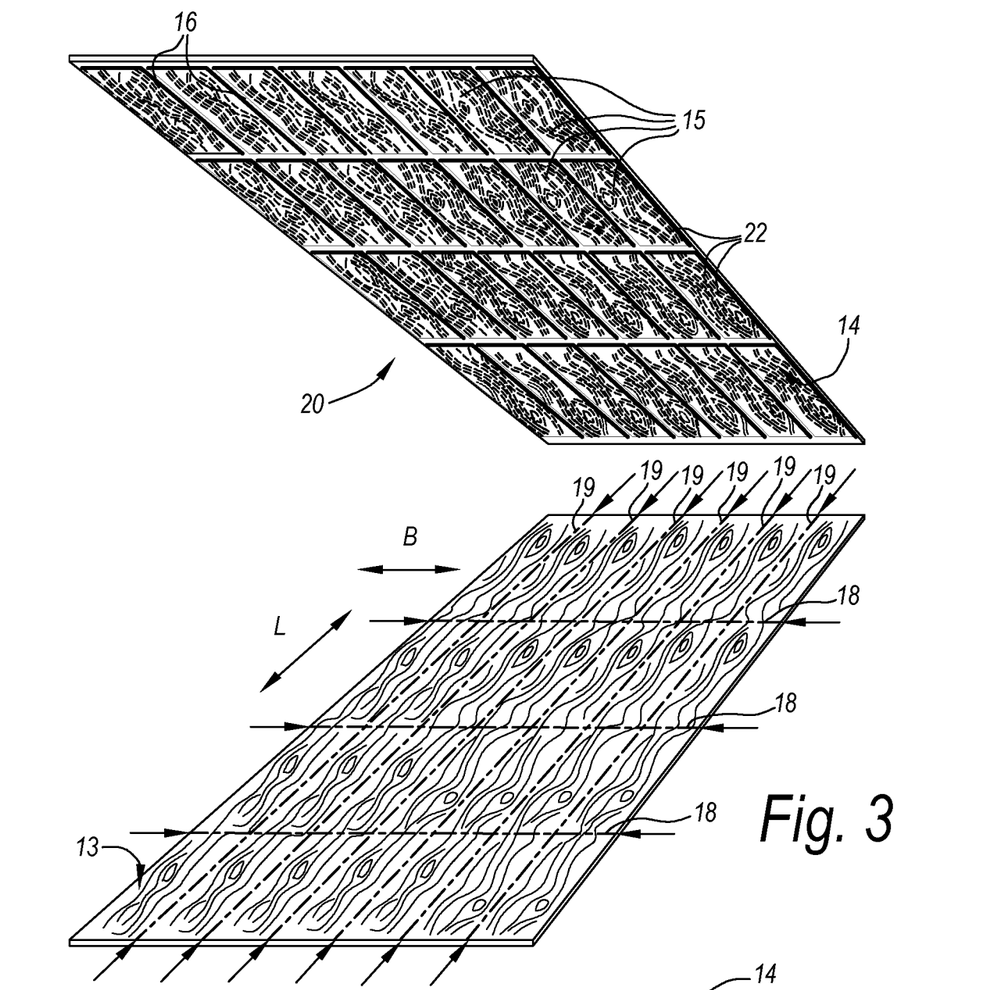
FIG. 3 schematically shows a view of the pressing side of the pressing element from the press of FIG. 1, together with an already compressed coated plate, more specifically laminate plate.

During the pressing operation, a pressing element 14 having the features of the invention is used on the decorative side 13 of the plate-shaped elements 2 to be pressed. As is shown in FIG. 3, this relates to a pressing element 14 having at least two sections 15 which exhibit a surface structure suitable for forming a structure on in each case one of the aforementioned floor panels 1 and having a first zone 16 which extends in a first direction, in this case in the longitudinal direction L, between the relevant sections. In the example, the surface structure of the relevant sections 15 is obtained by way of etching, whereas the aforementioned first zone 16 is substantially obtained by way of a milling operation.

After the pressing of the plate-shaped elements 2, wherein the substrate 4 and the aforementioned material layers 5-6-7 are consolidated to form a coated laminate plate, these plate-shaped elements 2 are sawn, by means of one or more sawing operations, to form floor panels 1, after which coupling means 17 are provided at the resultant edges of these floor panels 1, for example by means of a milling operation or in any other manner. The sawing of the plate-shaped elements 2 to form floor panels 1 is schematically shown in FIG. 3 by means of sawing lines 18-19, in the width direction B and the longitudinal direction L, respectively. One possible embodiment of the coupling means 17 to be produced is indicated in dashed lines in FIGS. 4 and 5. Preferably, these coupling means 17 are of the type that provides a vertical and horizontal locking action when two such floor panels 1 are coupled to each other. Examples of such coupling means 17 are widely known from the prior art and are described, for example, in patent documents WO 97/47834 and WO 01/98603.

As mentioned above, the aforementioned sections 15 are provided with a surface structure or relief formed by unevennesses or protrusions in order to form impressions in the upper side of the plate-shaped elements 2 during the pressing operation. The nature of the relief itself may vary depending on the intended impressions to be formed. By way of example, in FIGS. 4 and 5, two relief forms are shown on the pressing sides 20 of the pressing portions 15.

Figure 4:
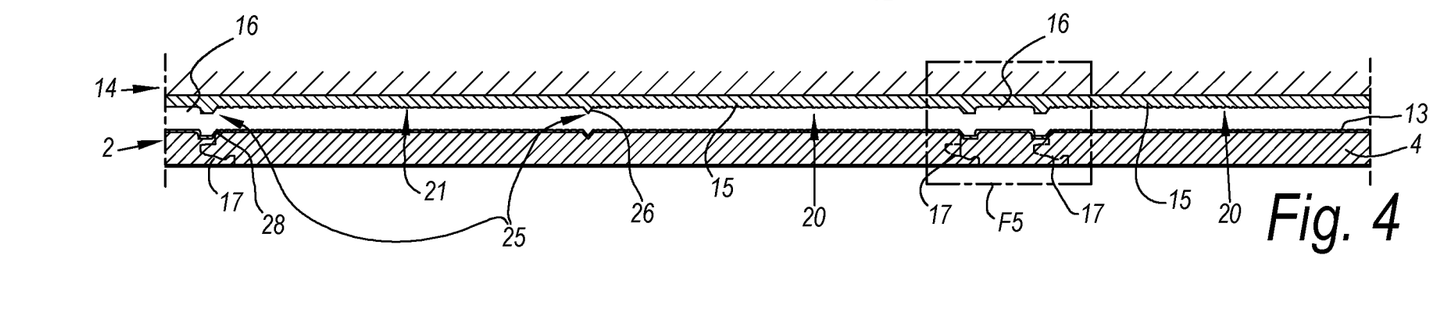
FIG. 4 shows a cross section along line IV-IV in FIG. 1 on a larger scale, but only of the pressing element and an already compressed coated plate, more specifically laminate plate.
Figure 5:
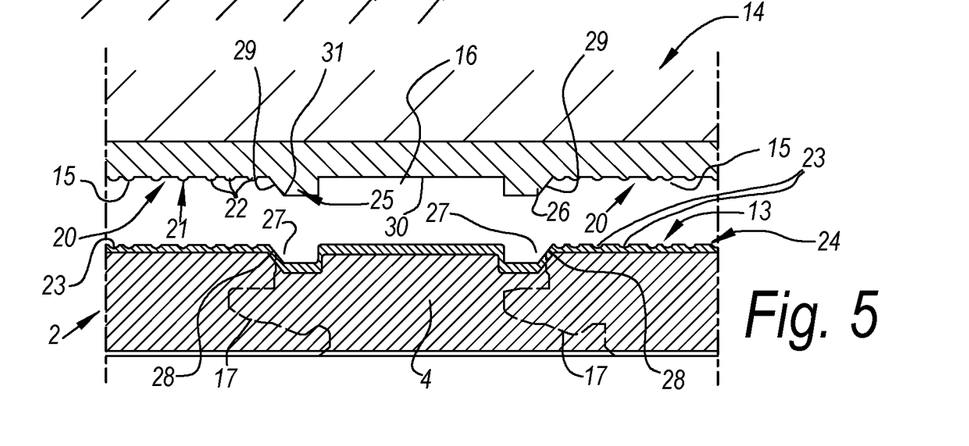
FIG. 5 shows the portion indicated by F5 in FIG. 4 on a larger scale.

In this case, a first relief 21 is composed of unevennesses or protrusions 22 which, during the compression operation, produce impressions 23 which form a relief 24 that imitates the natural surface of wood in the surface of the pressed product. In this case, the obtained impressions 23 are such that they imitate the pores and/or grains of wood.

A second relief 25 which is depicted in FIGS. 4 and 5 is formed from unevennesses or protrusions 26 which, during the compression operation, form impressions 27 which imitate the removed material portions or deformed portions. The example involves unevennesses 26 whereby grooves and edge regions 28, which are located at a relatively low position, are pressed into the surface of the plate-shaped elements 2 in order to thus obtain, as shown, chamfers or the like.

In order to form the aforementioned edge regions 28 which are located at a relatively low position, the aforementioned relevant protrusions 26 form an edge portion 29 of the section 15, said edge portion rising in the direction toward the aforementioned first zone 16. The first zone 16 comprises a first chamber 30 which is located at a lower position than the highest point 31 of the rising edge portion 29.

Figure 6:
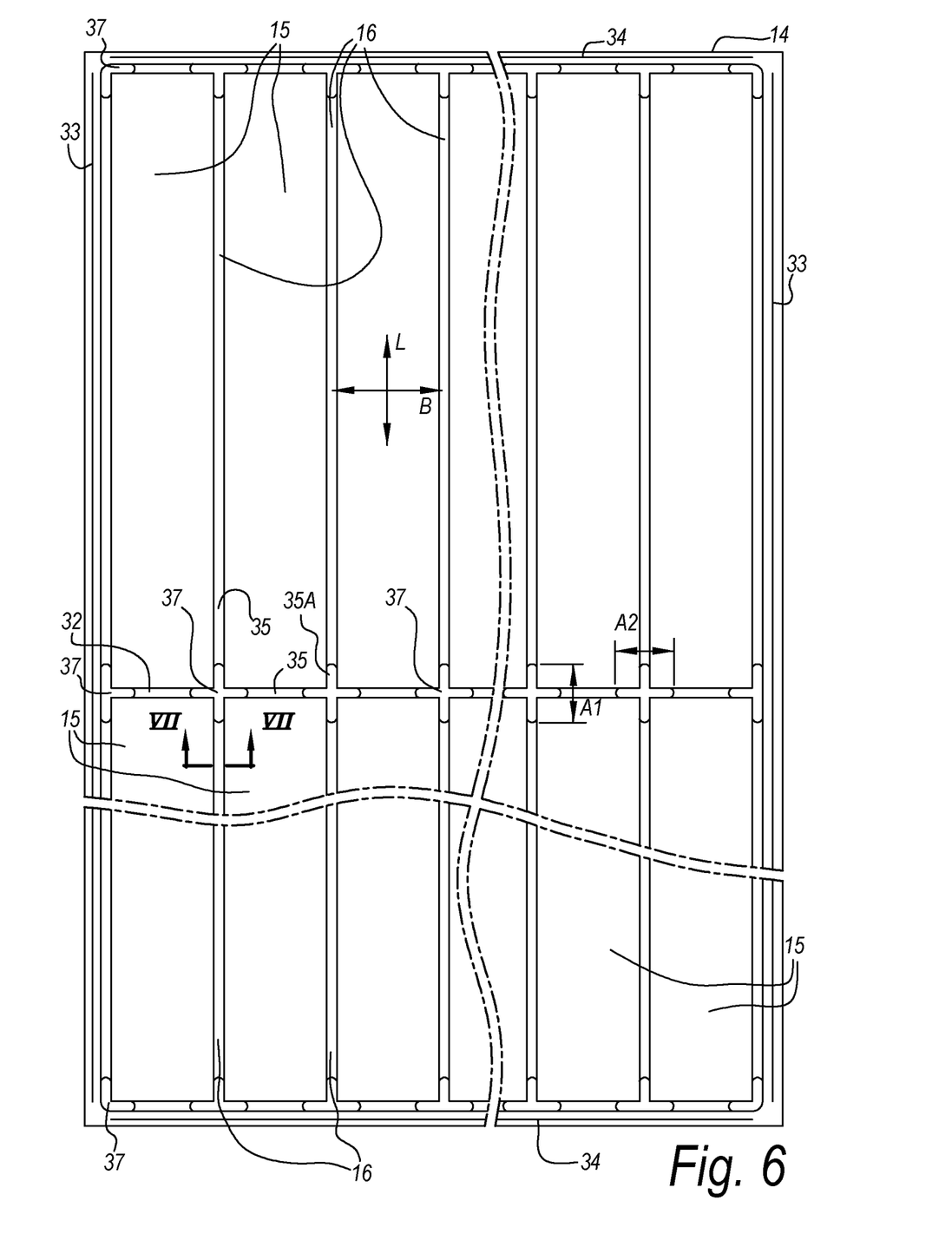
FIG. 6 shows a view according to the arrow F6 shown in FIG. 3 for one variant.
Figure 7:
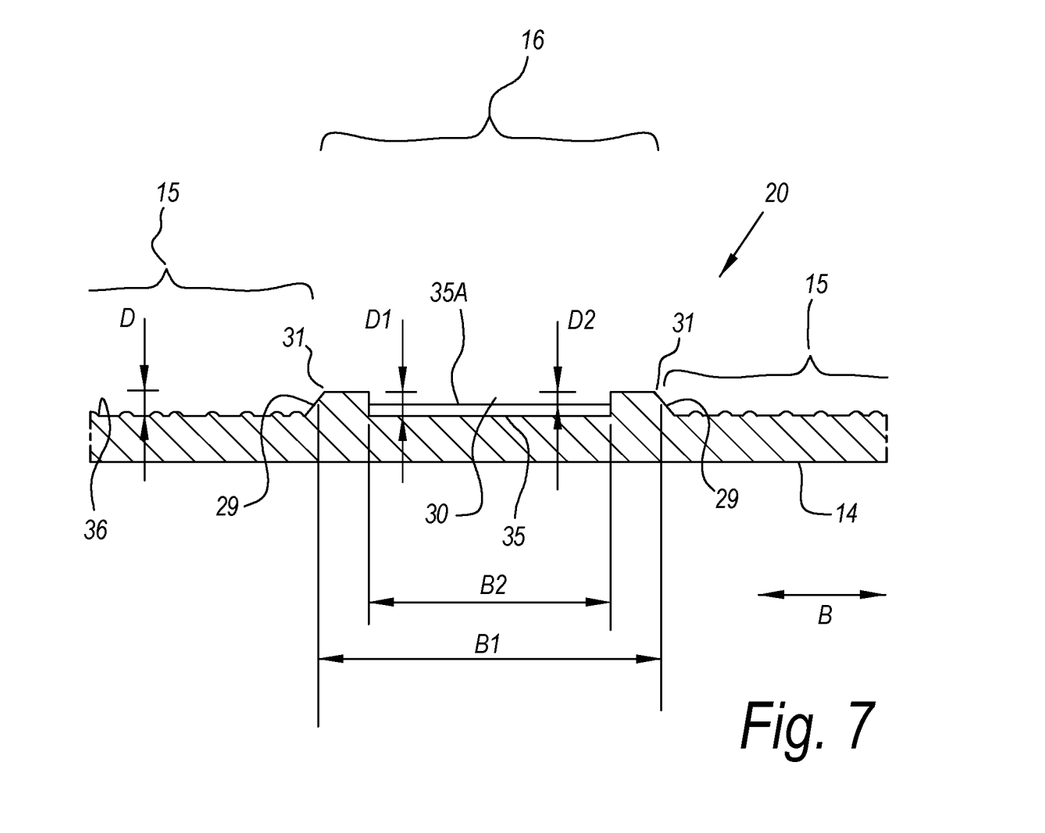
FIG. 7 shows a cross section according to the line VII-VII shown in FIG. 6 on a larger scale.

FIGS. 6 and 7 show the sections 15 and the first zones 16 in a more detailed view. It is clear from FIG. 6 that the pressing element 14 has at least two rows of in each case at least two sections 15, wherein, between the aforementioned rows, a second zone 32 also in a second direction B transverse to the direction L of the first zones 16. In the example, the second zone 32 also comprises a chamber which is located at a lower position than the highest point of the rising edge portion at the transverse ends of the sections 15. The first and second zones 16-32, as well as the respective chambers, extend over the full length and width B of the adjacent sections 15. In a transverse direction, the chambers have a width B2 which corresponds to at least 50% of the width B1 of the respective zone 15-32 or technical zone, in this case even 70% of the width B1.

In accordance with the first aspect mentioned in the introduction, the pressing element 14 has one or more markings 33-34 which make it possible to position and orient the aforementioned first zone 15, and, in this case, also the aforementioned second zone 32, for example in a milling machine. In the example, the markings 33-34 are configured as linear markings applied to the edge portions of the pressing side 20 of the pressing element 14. In this case, the markings 33 are parallel to the first direction L of the first zone 16 and applied at the two opposite long edges of the pressing side 20, and the markings 34 are parallel to the second direction B of the second zone 32 and applied at the two opposite transverse edges of the pressing side 20.

The aforementioned linear markings 33-34 are preferably obtained by way of an etching operation jointly with an etching operation used for forming the surface structure of one or more of the aforementioned sections 15. The linear markings may thus consist of linear etched recesses.

The structured surface of the aforementioned sections 15 corresponds to the surface of the intended coated panels, whereas the first zones 16 and second zones 32 correspond to the so-called technical zones, namely a portion of the pressing element 14 that is used to compress that portion of the coated plate which is intended to be removed when said plate is divided into separate coated panels and during the further machining thereof, for example for forming the aforementioned coupling means 17 thereon.

FIG. 7 also clearly shows that the first chamber 30 has a depth D1 such that the bottom 35 of the chamber 30 is positioned below the highest point of the surface structure of the section 15, in this case below the highest point 31 of the rising edge portion 29, and is positioned at most 0.3 mm below the lowest point 36 of the surface structure of the section 15. In the example, the bottom 35 is located at such a depth D1 below the highest point 31 of the rising edge portion 29 that the level of the bottom is identical or virtually identical to the level of the lowest point 36 of the surface structure of the adjacent sections 15.

At the location of the intersection 37 of the chambers of the first zones 15 and the second zones 32, the chambers have a bottom 35A at a depth D2 which is smaller than the overall depth D1 of the respective first and second zones 15-32.

In general, it is noted that the implementation of a relief or surface structure in the sections 15 is not restricted to the examples shown in FIGS. 4 and 5. By way of example, it is also possible for reliefs or unevennesses, respectively, to be implemented which imitate the natural and/or typical surface of materials other than wood, such as, for example, the surface of stone, ceramic or the like. In the imitation of certain types of stone, such as slate, these unevennesses may also be of terrace-like configuration, in order to for example imitate the flake-like surface of such types of stone. It is also possible for virtually microscopically small unevennesses to be applied to the pressing side 20 of the sections 15, said unevennesses being implemented, as is known, in order to provide the laminate surface, or certain portions thereof, with a dull appearance during the pressing operation. It is also possible to use a relief with unevennesses which are intended to leave behind impressions in the pressed product after the compression operation, said impressions imitating scraped-away material portions, for example in order to manufacture laminate floor panels which imitate so-called scraped wood.

As outlined in the introduction, the invention is most useful in the pressing of plate-shaped elements 2 which exhibit a decor 10 and wherein the relief, for example relief 24, applied in the plate-shaped elements 2 has to be configured so as to correspond or substantially correspond to the decor 10.

Preferably, the lowest point 36 of the surface structure of a section 15 is located at a depth D smaller than 1 mm in relation to the highest point 31 of the rising edge 29.

As mentioned above, use is preferably made of sections 15, of which the relief or surface structure present thereon is at least partially produced by means of an etching process, for example the relief for imitating pores and wood grains.

Furthermore, it is also noted that the highest point 31 of the rising edge 29 preferably forms part of the zone 15-32 or technical zone, as in the example of the figures. However, this highest point 31 is taken into account in representing the level of the lowest point 36 of the surface structure of a section 15, and in determining the highest point of the surface structure of the section 15.

Although the second zone 32 and chambers configured therein are not shown in detail in the figures, it goes without saying that they may have similar features to those described and/or shown for the first zone 15 and first chamber 30.

It is clear that the method for manufacturing laminate panels as shown, inter alia, in FIG. 1 has the features of the fifth independent aspect of the invention. The pressing element shown in the figures has the features of the first, second and third independent aspects, and can be obtained by means of a method having the features of the fourth independent aspect.

It is also clear that where an intersection 37 of the first zone 16 and the second zone 32 is discussed, it preferably refers to those respective portions of these zones which intersect and which extend over a certain distance A1-A2 in the respective directions L-B. This distance A1-A2 is for example 1 to 10 cm.

The present invention is by no means limited to the embodiments described above, but such methods and pressing elements may be realized in different variants without leaving the scope of the present invention.

The invention claimed is:

1. A pressing element for manufacturing coated panels, wherein this pressing element comprises a metal plate having at least two sections which exhibit a surface structure suitable for forming a structure on in each case one of the coated panels, and having a first zone which extends in a first direction between the two sections,
wherein the surface structure defines a lowest point and a highest point,
wherein the first zone comprises a first chamber which is located at a depth below the highest point and at most 0.3 mm below the lowest point;
wherein the pressing element has at least two rows of in each case at least two sections with the first zone;
wherein, between the rows, a second zone also extends in a second direction transverse to the first direction, and in that the chambers of the first and second zones, at least at the location of their intersection, are configured to be shallower than their overall depth.

2. The pressing element according to claim 1, wherein the pressing element comprises one or more separate markings which make it possible to position and orient both the first zone and the second zone.

3. The pressing element according to claim 1, wherein the pressing element comprises one or more separate markings which make it possible to position and orient the first zone;
wherein the one or more markings are applied to one or more edge portions of the surface of the metal plate.

4. The pressing element according to claim 1, wherein the pressing element comprises one or more separate markings which make it possible to position and orient the first zone;
wherein at least one of the markings is linear, parallel to the first direction.

5. The pressing element according to claim 1, wherein the pressing element comprises one or more separate markings which make it possible to position and orient the first zone;
wherein the surface structure of the sections and at least one of the markings are obtained by means of the same operation, by means of an etching operation.

6. The pressing element according to claim 1, wherein the surface structure of the sections comprises an edge portion which rises in the direction toward the first zone.

7. The pressing element according to claim 1, wherein the surface structure is substantially obtained by way of etching, whereas the first zone is provided with the chamber, substantially by means of a milling operation.

8. The pressing element according to claim 1, wherein the first chamber is located at a depth which deviates by at most 0.2 mm from the lowest point, either below or above the lowest point.

9. The pressing element, according to claim 1, wherein the first chamber is located at the level of or above the lowest point.

* * * * *